(12) United States Patent
Chase et al.

(10) Patent No.: US 11,306,834 B1
(45) Date of Patent: Apr. 19, 2022

(54) FLAPPER VALVE

(71) Applicant: Essex Industries, Inc., St. Louis, MO (US)

(72) Inventors: Ryan Chase, Saint Louis, MO (US); Phil Hampton, Saint Louis, MO (US)

(73) Assignee: Essex Industries, Inc., St. Louis, MO (US)

( * ) Notice: Subject to any disclaimer, the term of this patent is extended or adjusted under 35 U.S.C. 154(b) by 0 days.

(21) Appl. No.: 17/217,066

(22) Filed: Mar. 30, 2021

(51) Int. Cl.
*F16K 15/03* (2006.01)
*F16K 27/02* (2006.01)
*B64D 37/00* (2006.01)

(52) U.S. Cl.
CPC ........ *F16K 15/031* (2013.01); *F16K 27/0209* (2013.01); *B64D 37/005* (2013.01)

(58) Field of Classification Search
CPC .......... F16K 1/20; F16K 15/03; F16K 15/031; F16K 15/144; F16K 15/145; Y10T 137/7898
See application file for complete search history.

(56) References Cited

U.S. PATENT DOCUMENTS

| | | | | |
|---|---|---|---|---|
| 3,809,119 A | * | 5/1974 | Cave | F16K 15/031 137/527.8 |
| 8,201,576 B2 | * | 6/2012 | Klein | F16K 15/038 137/512.15 |
| 8,733,381 B2 | * | 5/2014 | Peyton | E03B 9/16 137/15.02 |
| 9,506,575 B2 | * | 11/2016 | Fallon | F16K 15/03 |
| 9,752,692 B2 | * | 9/2017 | Abouelleil | F16K 15/144 |
| 10,502,342 B2 | * | 12/2019 | Milroy | F16K 47/023 |

\* cited by examiner

*Primary Examiner* — Kevin F Murphy
(74) *Attorney, Agent, or Firm* — Lewis Rice LLC

(57) ABSTRACT

A flapper valve comprising a generally rigid flap which is mounted within a flexible body coating. The hinge in the flexible body is formed by using an internal reinforcement material having a permeated structure which allows for the body material to penetrate through the reinforcement material during the valve formation. This provides for a more sturdy hinge which better resists wear.

11 Claims, 4 Drawing Sheets

FLAPPER VALVE

BACKGROUND OF THE INVENTION

Field of the Invention

This invention relates to a flapper valve. Particularly to a flapper valve for use in an aircraft to inhibit fuel from moving away from the fuel pump which has improved wear resistance.

Description of the Related Art

Powered flight can easily be considered one of humankind's greatest accomplishments. The modern aircraft is an amazing piece of engineering and the skill requirements to keep it aloft are also impressive. Everything about an aircraft is quite a bit different from that of a ground based vehicle. The reason is immediately apparent. An aircraft operates in a three-dimensional space and is not supported by any solid surface. A ground-based vehicle typically only operates in a two-dimensional space as it needs to remain in contact with the ground during primary operation.

Operation in three-dimensional space presents aircraft with a number of concerns that ground based vehicles simply do not have. In the first instance, safety is a major concern as humans, whether as operators or passengers in an aircraft, are not native to the skies. Aircraft have to deal with the fact that they are operating in an environment which typically does not allow for a safe stop to disembark human passengers or crew. A ground-based vehicle can typically be simply stopped if there are concerns in its operation, passengers and operators can disembark, and the vehicle can be safely inspected and repaired. Thus, in most cases, ground-based vehicles major concern with failure of operation is safely coming to a stop and not in being able to get where they are going.

In an aircraft, there is typically no way to safely stop in midair. Instead, should an aircraft discover a midair concern, the aircraft still needs to have a place to land and safe landing typically requires sufficient aircraft operability, and sufficient landing space, for the aircraft to return to earth in a controlled fashion without hitting anything. An aircraft in midair is effectively only safe so long as it continues to operate correctly. This is mostly due to the pull of gravity on the aircraft trying to take it from the sky, as opposed to a ground-based vehicle where gravity typically assists in keeping it safely on the ground.

Further, the operation of an aircraft is also much more complicated than operation of a ground-based vehicle because of its need to operate within three-dimensions of movement as opposed to two. One of the major of these is that even while the aircraft is borne safely aloft by air, gravity is still acting both on the aircraft and its contents. While the air will typically comfortably support the aircraft itself during normal operation, the contents present another issue as they can move around within the aircraft body under the effects of both inertia and gravity. In effect, the contents of an aircraft are held aloft by their contact with the aircraft, not by flying themselves.

The phenomenon of the contents of an aircraft moving around relative to the aircraft itself under the effect of gravity is well known and often highly useful. For example, the concept of parabolic flight, where an aircraft rapidly climbs and drops, is used to train people on the feeling of weightlessness as when the aircraft is dropping, passengers which are not tethered to the aircraft structure can effectively "float" around the cabin. Actually, they are falling under the effect of gravity but with nothing to contact as the aircraft is descending at a related rate around them. It is even possible for ground-based vehicles, such as many roller coasters, to provide a simulation of this movement. However, in those cases, restraints are typically required to keep the passenger in the ground-based vehicle limiting the effect.

While parabolic flight can be useful for weightlessness training, on commercial transportation flights it can be a lot less so and for this reason commercial flights typically utilize passenger restraints (e.g. seatbelts) to keep the passengers connected to the aircraft. Restraint of the load, and not just passengers, to inhibit it from moving around is, in fact, near universal in aircraft. Loads in aircraft are typically rigidly connected to, or otherwise restrained, against the frame of the aircraft to inhibit their movement. For example, baggage or cargo loaded onto commercial flights is often restrained in position vertically through the use of heavy cargo nets or simply by having spaces loaded fairly tightly. This inhibits the individual pieces of luggage from moving during the flight.

Unexpected movement of loads is typically not nearly as major a concern in a ground-based vehicle as it is in an aircraft. While ground-based vehicles can have problems with loads shifting, for example a book sliding out of the seat in a sudden stop or being pushed into another passenger when a vehicle makes a hard turn, these are effects more of inertia than gravity. Loads of heavily loaded vehicles (such as over the road trucks) are typically retrained so they cannot maintain their own inertia during points where the vehicle is accelerating in a different direction. For example, large trucks need their loads balanced to reduce potential dangers from wind and strong cornering actions. However, even large loads in ground-based vehicles are only potentially moved by gravity relative to the aircraft in certain limited situations, such as steep slopes.

In smaller ground-based vehicles, there is typically no need for any form of load balancing. For example, most passenger cars can be safely operated with the passengers unequally distributed in the cabin. For larger vehicles, however, load balancing can be a major concern as inaccurately distributed loads can result in loss of control, sway and rollover, and other related concerns. Further, improperly secured loads that can move during transit can result in movement of a load and bad load balancing or changing load balancing in motion. However, these effects are, again, often caused more by inertia than by gravity.

The issues of load balancing are magnified in aircraft. While aircraft suffer all the same problems of loads moving via inertia, they also have to deal with gravity's effect on their load and on themselves. For example, aircraft typically need to be loaded in a fashion that inhibits them from having one side heavier than the other as weighing down one side of an aircraft can not only result in inefficiencies in operation, but can result in a vehicle with reduced ability to maintain itself aloft and with a loss of expected control. One major concern in load balancing, and in load securing generally, in an aircraft is fuel movement.

Typical commercial aircraft at takeoff will typically have 25-50% of their total weight be in fuel. Thus, fuel weight and weight distribution is often a substantial issue in an aircraft. Further, aircraft fuel is typically a liquid and is consumed during flight. Thus, fuel position in an aircraft is strongly dependent on the effect of gravity on the aircraft and while fuel can be constrained in a tank or other structure, it is very difficult to keep it from flowing under the force of gravity or its own inertia as the tank will have different amounts of fuel in it at different points in the flight.

It is, thus, very important that fuel be maintained in a known location and not be allowed to move around unexpectedly. For example, if fuel can freely move between tanks within an aircraft or be used inaccurately from different tanks, it can create instability in the aircraft as the fuel is consumed. At the same time, aircraft fuel tanks do need to be able to shift fuel around to get the fuel to engines and other components. Further, failure of fuel pumps within certain tanks or failure of engines in multi-engine aircraft can result in a need to provide fuel from a secondary tank to a particular engine to keep the aircraft aloft and to provide the ability to maintain load balancing as fuel is now consumed in an unexpected fashion.

Movement of fuel within an aircraft can be a particular problem even under perfect operational conditions. When something goes wrong in the operation of an aircraft, the condition can be substantially worse. Specifically, even aircraft flying as intended do not typically remain level (or with their main body generally parallel to the ground). Thus, there is a need to provide storage facilities that deal with movement ("sloshing") and valves and similar devices to make sure that fuel and other liquid materials are correctly fed where they need to go. Often, even the simplest fuel flow needs to be maintained in a unidirectional fashion or fuel needs to, at least, be maintained in an area of the tank where a fuel pump or other structure can act on it. One place for undesirable fuel motion is in conjunction with fuel bulkhead openings. In these, it is generally desirable for fuel to be maintained in an area where a fuel pump can access it.

A simple but effective solution for controlling the movement of liquid through an opening, such as in a bulkhead, is a flapper valve. A flapper valve is typically of simple construction comprising a lid to the opening with a hinge. The valve can be forced open when it is pushed away from the opening, but typically cannot be forced in the other direction as the rigid structure surrounding the opening will block movement of the flapper valve. However, forcing the flapper open away from the opening is often inhibited by biasing members and often by the mass of liquid itself resting on the flapper.

Many people are quite familiar with flapper valves as they are near ubiquitous in the flushing mechanism of a typical toilet. A flapper valve typically seals against the hole in the base of the storage tank on the back of the toilet. This allows for water to be held in the tank at the ready. When the flushing lever is turned, the user forces the flapper to rotate upward around a hinge, away from the opening, and through the water in the tank, which is holding the valve in place. This opens the hole and the water in the tank rushes through cleaning the bowl. A sufficiently high water level also holds the flapper valve up as it floats. After the water level drops sufficiently in the tank, the mass of the flapper overcomes the supporting ability of the remaining water, and gravity pulls the flapper back down against the hole. Water then rapidly covers the flapper and the mass of the water entering the tank again holds the flapper in place on the hole.

In aerospace applications, flapper valves are not necessarily much more complicated than the toilet valve. Traditionally, an aerospace flapper valve has simply been a flap of rigid material which is then riveted to a hinge which is in turn fastened to the bulkhead near the hole to be sealed. These suit the purpose of closing the hole using the mass of fuel and/or the bulkhead structure itself to hold them shut when they are supposed to be while allowing fuel to easily flow through them (at least on one direction) when needed.

Such a simple valve can, for example, help maintain relatively equal fuel levels between tanks or areas without the need for active monitoring.

However, this simple construction also provides a problem. It is relatively easy for a flapper valve to fail. Specifically, traditional flapper valves have a weak point at the hinge and the material(s) forming the hinge can crack, deform, or break, as the materials of the hinge are often bent repeatedly. This is particularly true where a natural hinge is used as the repeated deformation results in intense wear on a very small area. Further, the use of metallic parts in flapper valve construction to provide for rigidity and strength creates a possibility of static accumulation and discharge and transmission of electricity such as in an electrical storm. It should be immediately apparent that electrical discharge in an aircraft fuel system is to be avoided and, therefore, metal hinges are typically unusable as a replacement for natural hinges in aerospace flapper valves. Thus, often the most wear resistant materials are not available for flapper valve construction.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a flapper valve comprising a generally rigid flap which is mounted within a flexible body coating. The hinge in the flexible body is formed by using an internal reinforcement material having a permeated structure which allows for the body material to penetrate through the reinforcement material during the valve formation. This provides for a more sturdy hinge which better resists wear. The valve can be constructed without metal components or can utilize metal components within non-metallic insulative components to inhibit static discharge or electrical carrying capability of the valve, and is of particular use in aerospace applications.

There is described herein, among other things, a flapper valve comprising: a flapper; a sheet of reinforcement material, the reinforcement material having a permeated structure; and a body, the body enclosing the reinforcement material and at least a portion of the flapper, the body material permeating through the permeated structure of the reinforcement material; wherein, the body extends around a periphery of said flapper and forms a connector portion spaced from said flapper, said body also forming a trough between said periphery of said flapper and said connector portion which extends across the sheet of reinforcement material; and wherein said trough forms a natural hinge for said flapper to rotate relative to said connector portion of said body.

In an embodiment of the valve, the flapper is in the shape of a disk.

In an embodiment of the valve, the body extending around said periphery of said flapper forms a ring around said periphery which ring extends over a portion of each major surface of said flapper.

In an embodiment, the valve further comprises an opening through said connector portion.

In an embodiment, the valve the further comprises at least one additional opening through said connector portion.

In an embodiment of the valve, the opening extends through said body and said reinforcement material.

In an embodiment of the valve, the flapper is formed from at least one of metal, fiberglass, or plastic.

In an embodiment of the valve, the reinforcement material comprises a woven fabric.

In an embodiment of the valve, the reinforcement material comprises a formed mesh.

In an embodiment of the valve, the reinforcement material is formed from at least one of polytetrafluoroethylene, polyester, nylon, or poly-paraphenylene terephthalamide.

In an embodiment of the valve, the body is formed from at least one of rubber or plastic.

DETAILED DESCRIPTION OF THE PREFERRED EMBODIMENT(S)

FIGS. 1-4 provide an embodiment of a flapper valve (100) which is designed to have improved longevity by reinforcement of the hinge area through the use of a multi-layer permeated natural hinge. The flapper (101) of the valve (100) is typically formed from a single piece of rigid material such as, but not limited to, metal, fiberglass, or plastic. In an aircraft application the flapper (101) will preferably be poorly or non-conducting material (e.g. aluminum) but this is by no means required. The flapper (101) comprises the substantive "valve" of the valve (100) and will typically serve to protect the opening upon which the flapper valve (100) is placed from external pressure or actuating force. It is thus, typically sized and shaped, to cover the opening that the flapper valve (100) is designed to variably open and close.

In the depicted embodiment, the flapper (101) is in the shape of a thin disk, but this is by no means required. However, a circular disk shape will likely be the most common as most ports or openings that would be sealed by a flapper valve (100) are round or can be sealed by a round flapper (101). Further, a round flapper (101) shape means that the flapper (101) typically will not have any points or protrusions which could become bent more easily than the remaining structure of the flapper (101).

Figure 4:
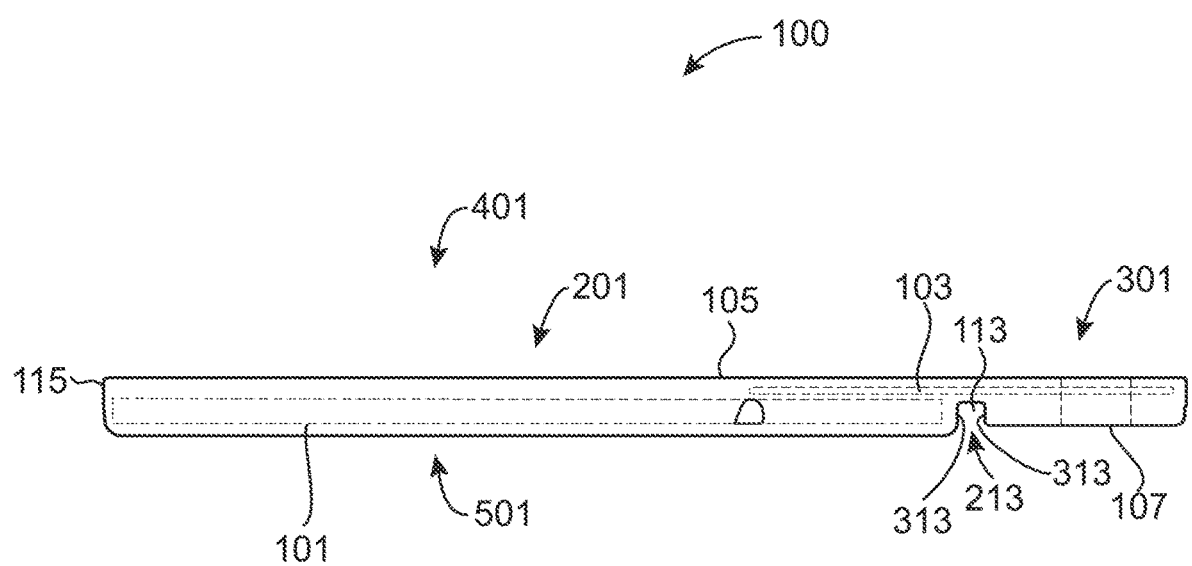
FIG. 4 provides an edge view of FIG. 3 with the front side facing downward.

The flapper (101) is positioned adjacent to a hinge (113) as is best seen in FIG. 4. In an embodiment, the hinge (113) may comprise a mechanical hinge having two leaves with a knuckle and pintle between. However, it is generally preferred that the hinge (113) actually comprise a natural hinge formed from a flexible piece of reinforcement material (103) which extends across the hinge (113) in combination with material of the body (105).

It should be recognized that a natural hinge effectively just makes use of the natural flexibility of material. Thus, one aspect of the present design is to inhibit movement of the flapper along a line other than the line of the hinge (113). To do this, the hinge (113) effectively is, as can best be seen in FIG. 4, in the form of a trough (213) between the flapper portion (201) of the body (105) and what is called the connector portion (301) of the body (105) which is used to connect the valve (100) to the area near the opening the valve (100) will act on.

The trough (213) will be generally linear and will be the portion of the body (105) where the body (105) is typically thinnest. This is, however, by no means required and the trough (213) may not actually include less material in cross section than other components. However, making the trough (213) thinner than the remaining body (105) portions (201) and (301) provides a natural point of weakness for purposes of the body (105) bending. Thus, should force be applied to the flapper portion (201) out of the page in FIG. 2 or relative to the connector portion (301) in a direction generally more perpendicular to the line of the trough (213), and the plane of the disk of the flapper (101), the natural weakness of the body (105) at the trough (213) will typically result in the flapper portion (201) being moved relative to the connector portion (301) at the trough (213).

The trough (213) will typically extend over a portion of the reinforcement material (103) making the reinforcement material (103) part of the hinge (113). Thus, the trough (213) provides a line of rotation spaced from the flapper (101) so that the flapper portion (201) can move as an inflexible piece relative to the connector portion (301) bending through both the body (105) material and the reinforcement material (103) at the trough (213).

The reinforcement material (103) is preferably flexible so that it can be bent at the trough (213). The reinforcement material (103) also will preferably have a permeated or other similar structure where there are holes in the reinforcement material (103). In an embodiment, the reinforcement material (103) may comprise a fabric, netting, or similar material formed from natural and/or synthetic threads which are woven, knitted, or otherwise formed into a generally planar sheet. Preferably, such reinforcement material (103) would have a relatively open weave to create the permeation of the reinforcement material (103). In another embodiment, the reinforcement material (103) may comprise a mesh material formed as a single piece with built in holes such as, but not limited to, a plastic mesh. The plastic mesh may, for example, be formed of materials such as, but not limited to, polytetrafluoroethylene, polyester, nylon, or poly-paraphenylene terephthalamide.

In forming of the valve (100), the reinforcement material (103) and flapper (101) are interconnected using the material of the flexible body (105) which effectively encapsulates a good portion of the various components. The body (105) typically comprises rubber, such as flourosilicone, nitrile butadiene, or silicone but may alternatively comprise a flexible plastic or other flexible material. In order to form the material of the body (105) into the body (105), the chosen material will typically be formed using compression or injection molding techniques with the reinforcement material (103) and flapper (101) being molded into the body (105) material as part of the molding process.

In particular, the body (105) is typically formed so that the hinge (103) and flapper (101) are internal to the body (105) such as is best shown in FIG. 4. As can be best seen in FIGS. 2 and 4, the reinforcement material (103) will typically overlap a portion of the flapper (101) around the periphery of the flapper (101) forming a ring (115). The reinforcement material (103) may be attached to the flapper (101) directly such as through the use of adhesives or mechanical fasteners or may be attached to the flapper (101) solely through the use of the body (105) material. In this latter arrangement, the body (105) material may permeate through the holes in the reinforcement material (103) to contact the flapper (101) directly. This can have an adhesive effect and/or can serve to help surround the flapper (101) to inhibit movement.

Figure 1:
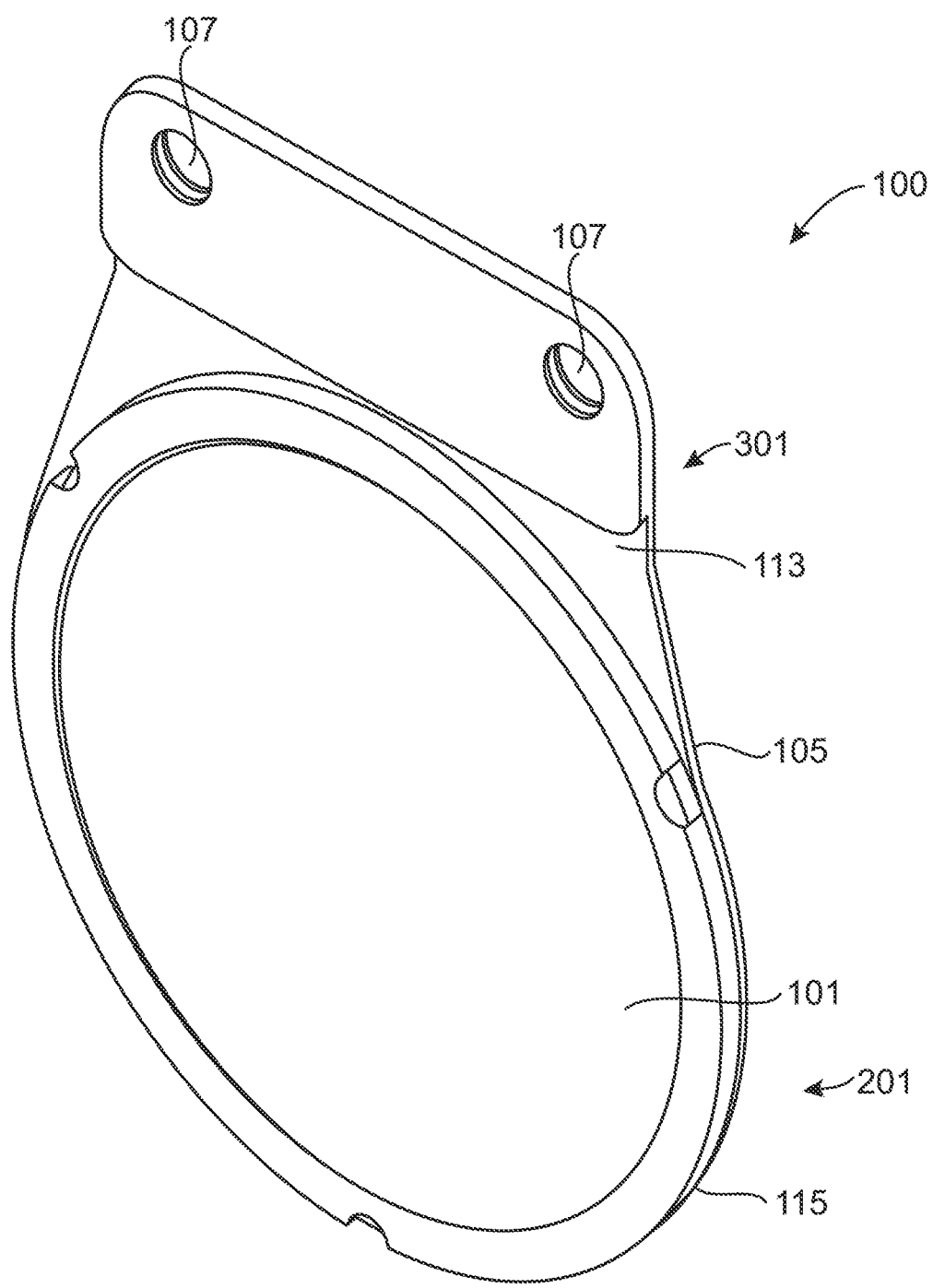
FIG. 1 provides a front perspective view of an embodiment of a flapper valve.
Figure 2:
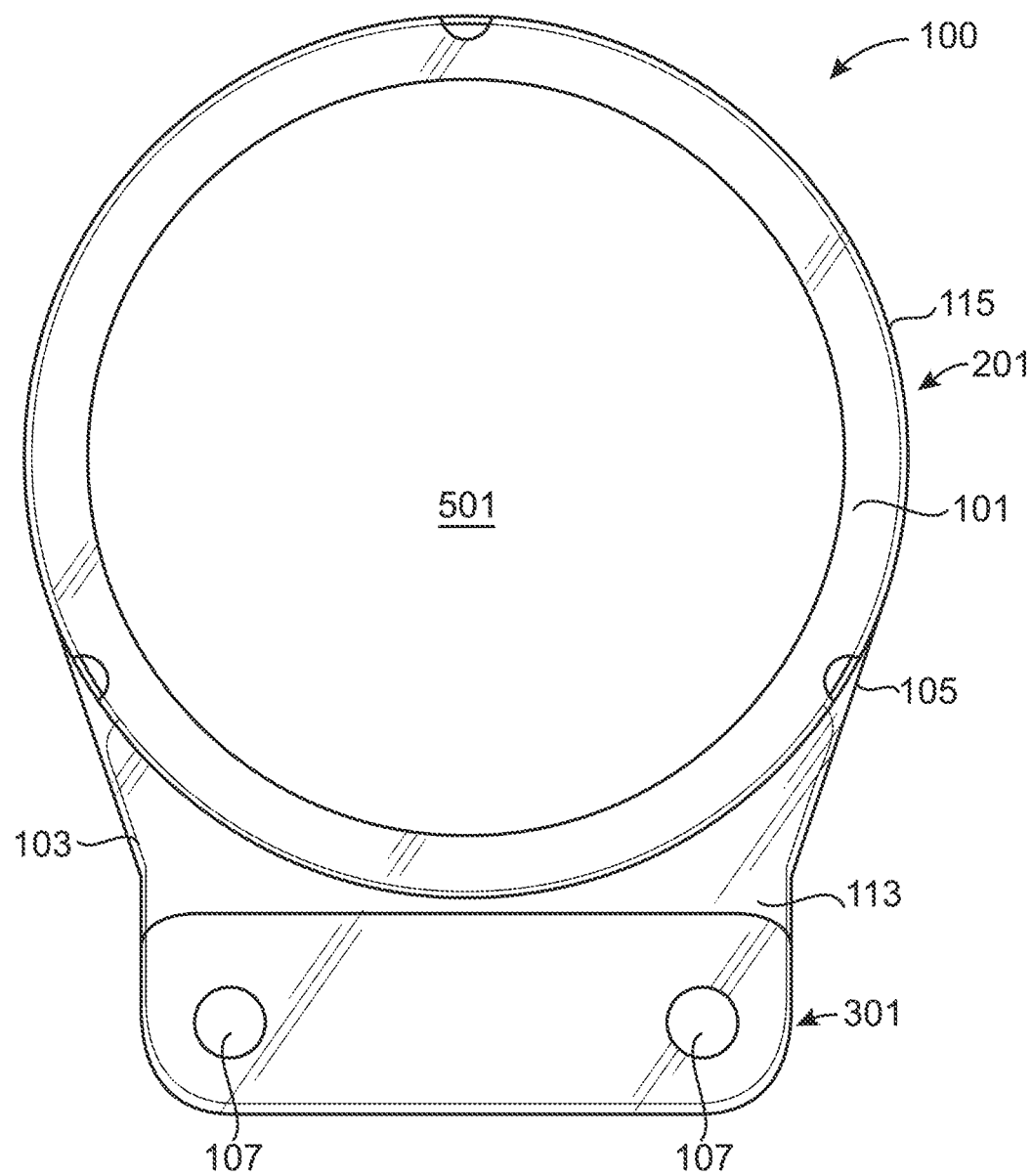
FIG. 2 provides a front view of the flapper valve of FIG. 1 with the flexible body rendered partially translucent so that positioning of the internal components can be seen.
Figure 3:
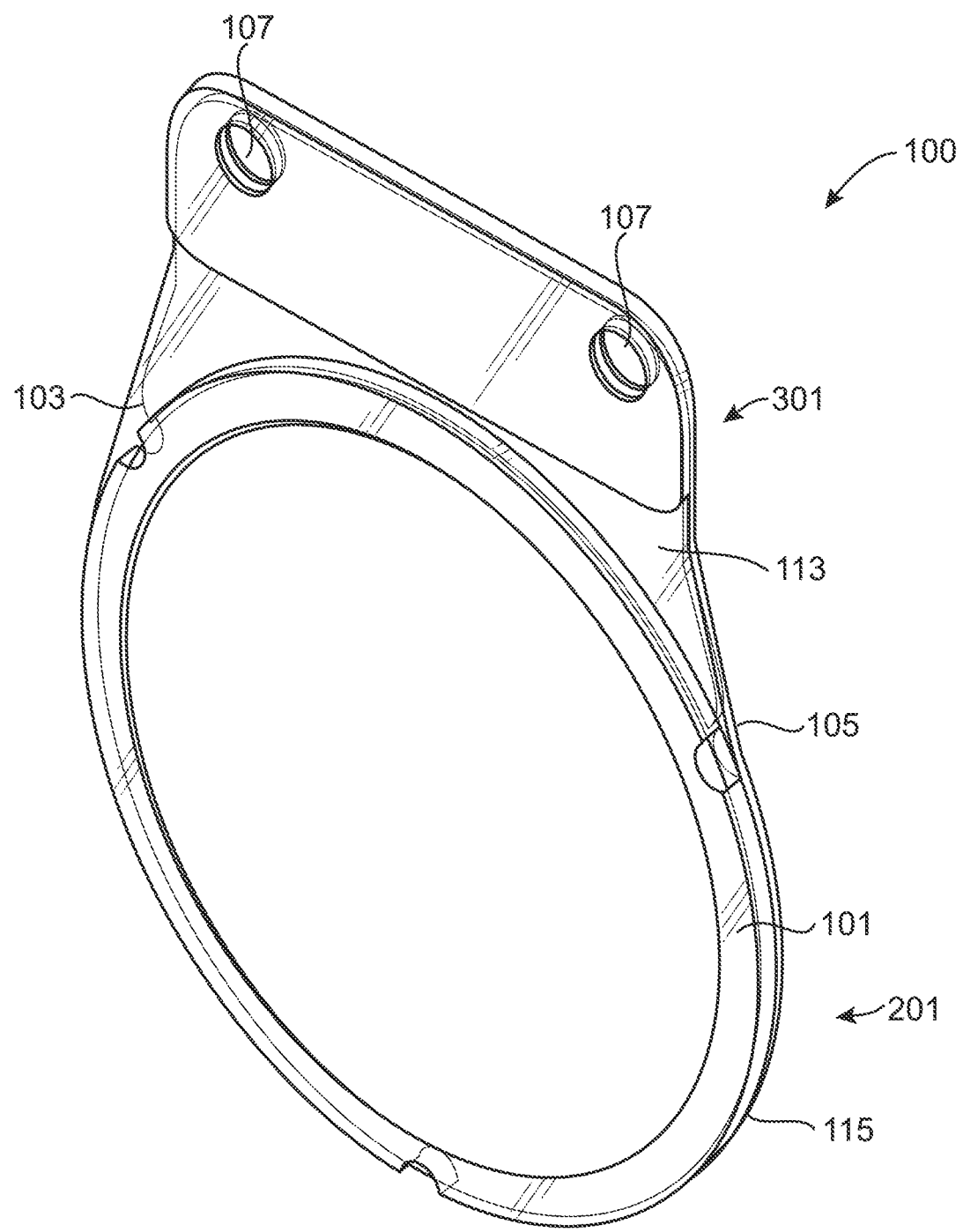
FIG. 3 provides the view of FIG. 1 with the flexible body rendered partially translucent so that positioning of the internal components can be seen.

As can be best seen in FIGS. 2 and 3, the body (105) will typically not cover the entire structure of the flapper (101) but will simply surround its periphery and extend a short distance over both major surfaces of the flapper (101) effectively forming a ring (115) around the periphery of the flapper (101). Thus, an internal circle of material on both sides of the flapper (101) is visible as can be best seen on the front side (501) in FIG. 1.

This structure provides that when the valve (100) is positioned over an opening, the flapper (103) itself would typically not be in contact with the surface surrounding the opening. Instead, the body (105) portion which forms the ring (115) around the periphery of the flapper (101) would typically be in contact with the surface surrounding the opening. Thus, so long as the material of the body (105) is electrically insulative, it would inhibit any electrical flow from the surface of the opening into the flapper (101). Not needing to cover the entirety of the flapper (101) can result in a decreased cost of materials and simplified construction. In an alternative embodiment, the body (105) material would completely enclose or encapsulate the entire flapper (101).

The body (105) will typically completely enclose or encapsulate the reinforcement material (103). To the extent that the reinforcing material (103) would be not encapsulated, it would typically be on the edges of the body (105) or within the edges of the holes (107). In these locations, the edge of the sheet of the reinforcement material (103) may be exposed. However, one of ordinary skill in the art would understand that the inclusion of such small points of access does not alter the reinforcement material (103) effectively being encapsulated by the body (105).

The formation of the body material into the body (105) will typically give the resultant valve (100) its shape and structure. Further, formation of the body (105) with the reinforcement material (103) and flapper (101) in place will also typically result in the material of the body (105) not just enclosing the reinforcement material (103) but with the body material permeating through the holes in the reinforcement material (103) so as to place strands of body material through the reinforcement material (103). Theses strands may also be integrally formed with the remainder of the body (105).

This effect can be enhanced with forming techniques which place the body (105) material under pressure when it is in a flowable state as that can serve to better force the body material through the permeations in the reinforcement material (103). Forming the body (105) in this manner means that the bending action to move the flapper (101) is actually performed by a combination of reinforcement material (103) and body material (105) not just in sandwiched layers but as an effectively unified structure.

While the reinforcement material (103) lies on one side of the flapper (101) as can be best seen in FIG. 4, the body material (105) will typically be arranged so as to be generally planar on one side. That is the back side (401) of the body (105) will typically be generally planar over the ring (115), trough (113), and connection portion (301). The other or front side (501) will typically not be planar. Specifically, the front side (501) will include an indent forming the trough (113). Further, the structure of the connection portion (301) in the depicted embodiment is not as thick as the flapper portion (201) as it does not include the structure of the flapper (101) therein, which can have substantial thickness relative to the body (105). However, as can be best seen in FIG. 4, the valve (100) is still generally in the form of a generally flat sheet.

The planar back side (401) will typically comprise the side which is placed adjacent the opening when the valve (100) is in use. In this way, the position of the valve (100), when flat, will serve to seal the opening. While installation the other way is possible, it can create a gap from the flapper portion (201) resting at an angle to the connection portion (301) unless the mounting is done correctly. Further, it should be apparent that while the trough (113) forms a natural hinge which can move, at least to some degree, in both directions, the range of motion of the valve (100) bending toward the side (401) (e.g. side (401) is bent into an angle of less than 180 degrees (obtuse or acute angle) while side (501) is bent into an angle of greater than 180 degrees (reflex angle)) is greater. In particular, bending toward side (401) means the walls (313) of the trough (213) are spread apart and do not interact, while bending in the opposite direction toward side (501) will typically result in the walls (313) of the trough (213) eventually impacting each other and likely limiting the available angle of such a bend.

In order to attach the valve (100) to the surface surrounding the opening it is to open and close, the valve (100) may include one or more holes or openings (107) through the connecting portion (301). These will typically be used for connecting fasteners holding the connecting portion (301) to the appropriate surface. These fasteners may be of any form but will typically comprise rivets, screws, or similar materials. There will typically be at least two openings (107) which will typically be positioned through the body (101) symmetrically about a line generally perpendicular to the trough (213) and through the center axis of the disk of the flapper (101). In this way, the flapper (101) is allowed to freely move about the line of rotation at the trough (213) even while the remaining structure of the valve (100) may be firmly attached to the surface surrounding the opening the valve (100) is designed to open and close. The synchronicity makes it easier to install the valve in position, and can also inhibit the valve (100) from sliding or rotating about the fasteners in the openings (107).

As can be seen from the FIGS., It is generally preferred that the openings (107) also pass through the reinforcement material (103). This is, however, by no means required. Having the openings (107) pass through the reinforcement material (103) serves to make the area around the openings (107) reinforced not just by the body material but also by the reinforcement material (103) in a similar manner to what was performed at the hinge (113). This can serve to make the openings (107) stronger and the valve (100) less able to tear away from the fasteners.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "parallel" are purely geometric constructs and no real-world component or relationship is truly "parallel" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A flapper valve comprising:
   a flapper;
   a sheet of reinforcement material, said reinforcement material having a permeable structure; and
   a body, the body enclosing said reinforcement material and a portion of said flapper around a periphery of said flapper, said body forming a ring which extends over a portion of each major surface of said flapper, said body material permeating through said permeable structure of said reinforcement material;
   wherein, said body extending around said periphery of said flapper forms a connector portion spaced from said flapper, said body also forming a trough between said periphery of said flapper and said connector portion which extends across the sheet of reinforcement material; and
   wherein said trough forms a natural hinge for said flapper to rotate relative to said connector portion of said body.

2. The valve of claim 1 wherein said flapper is in the shape of a disk.

3. The valve of claim 1 further comprising an opening through said connector portion.

4. The valve of claim 3 further comprising at least one additional opening through said connector portion.

5. The valve of claim 3 wherein said opening extends through said body and said reinforcement material.

6. The valve of claim 1 wherein said flapper is formed from at least one of metal, fiberglass, or plastic.

7. The valve of claim 1 wherein said reinforcement material comprises a woven fabric.

8. The valve of claim 1 wherein said reinforcement material comprises a formed mesh.

9. The valve of claim 1 wherein said reinforcement material is formed from at least one of polytetrafluoroethylene, polyester, nylon, or poly-paraphenylene terephthalamide.

10. The valve of claim 1 wherein said body is formed from at least one of rubber or plastic.

11. The valve of claim 1 wherein, a portion of said body is between said reinforcement material and said flapper.

* * * * *